United States Patent
Shiraishi

(10) Patent No.: US 7,663,677 B2
(45) Date of Patent: Feb. 16, 2010

(54) IMAGING APPARATUS WITH GRADATION SEQUENCE CONVERSION BASED AT LEAST UPON ZOOM POSITION

(75) Inventor: Kenji Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 897 days.

(21) Appl. No.: 10/914,196

(22) Filed: Aug. 10, 2004

(65) Prior Publication Data

US 2005/0062854 A1    Mar. 24, 2005

(30) Foreign Application Priority Data

Aug. 18, 2003   (JP) ............... 2003-294665

(51) Int. Cl.
- H04N 5/217 (2006.01)
- H04N 5/262 (2006.01)
- H04N 5/202 (2006.01)
- H04N 5/20 (2006.01)

(52) U.S. Cl. ............ 348/254; 348/241; 348/240.3; 348/255

(58) Field of Classification Search ........... 348/222.1, 348/240.3, 234, 241, 254–256
See application file for complete search history.

(56) References Cited

U.S. PATENT DOCUMENTS

| | | | |
|---|---|---|---|
| 5,606,630 A | 2/1997 | Maeda et al. | |
| 5,974,190 A | 10/1999 | Maeda et al. | |
| 6,415,049 B1 * | 7/2002 | Yanagita et al. | 382/132 |
| 6,763,187 B2 | 7/2004 | Shiraishi | |
| 7,409,151 B2 * | 8/2008 | Kato et al. | 396/72 |
| 2003/0071908 A1 | 4/2003 | Sannoh et al. | |
| 2003/0071911 A1 | 4/2003 | Shinohara et al. | |
| 2003/0137597 A1 * | 7/2003 | Sakamoto et al. | 348/371 |
| 2003/0146988 A1 | 8/2003 | Shiraishi | |
| 2003/0147000 A1 | 8/2003 | Shiraishi | |
| 2003/0169346 A1 | 9/2003 | Ojima et al. | |
| 2004/0130632 A1 | 7/2004 | Shiraishi | |
| 2004/0179111 A1 * | 9/2004 | Hattori | 348/222.1 |
| 2006/0062558 A1 * | 3/2006 | Kato et al. | 396/72 |

FOREIGN PATENT DOCUMENTS

| | | |
|---|---|---|
| JP | 6-253147 | 9/1994 |
| JP | 2002-369796 | 12/2002 |
| JP | 2003-087604 | 3/2003 |
| JP | 2003069896 A * | 3/2003 |

OTHER PUBLICATIONS

Machine Translation of JP2003-069896 to Enomoto published Jul. 3, 2003.*

* cited by examiner

Primary Examiner—Sinh Tran
Assistant Examiner—Daniel M Pasiewicz
(74) Attorney, Agent, or Firm—Oblon, Spivak, McClelland, Maier & Neustadt, L.L.P.

(57) ABSTRACT

An imaging apparatus of the present invention includes an optical lens unit of a photographic optical system; an imaging device for converting light received through the optical lens to electrical signals; a zooming device for changing a focal length of the photographic optical system; a zooming position detector for detecting a current zooming position; an A/D converter for converting analog image signals outputted from the imaging device to digital image signals; and a gradation sequence converter which converts a gradation sequence characteristic of the digital image signals by referring to a gradation sequence conversion table for converting the gradation sequence characteristic, wherein converting amounts of the gradation sequence conversion table are changed based on a current zooming position detected by the zooming position detector.

13 Claims, 2 Drawing Sheets

IMAGING APPARATUS WITH GRADATION SEQUENCE CONVERSION BASED AT LEAST UPON ZOOM POSITION

BACKGROUND OF THE INVENTION

1. Field of the Invention

The present invention relates to an imaging apparatus, and more specifically, to an electronic camera which changes a gradation sequence characteristic by a zoom lens.

2. Description of the Related Art

A conventional technique is disclosed in JP-A 2002-369796, which matches luminance differences with a dynamic range in an endoscope based on a luminance distribution of a photogenic subject, and which shifts a gamma table in accordance with a zooming position to remove an influence of light other than the light from the subject which is subjected to photographing. As in this conventional technique, heretofore a gradation sequence characteristic is changed based on the luminance distribution or the like of the subject. However, in this method, it is impossible to discriminate a part which is originally black but photographed bright from a grey part which is originally blighter than black. In other words, there has been a problem that even if the subject is grey which is blighter than black, the grey part is compensated to be darker.

In some zoom lenses, for example, a degree of influence with the light other than the light from the subject photographed varies, depending on positions of the lenses at a "wide-range" side in which a focal length is short and at a "telescopic-range" side in which a focal length is long. For example, there is one which tends to be influenced more by the light other than the light from the subject as the lenses are shifted to the "telescopic-range" side, resulting in a brighter entire picture. The influence floats the black in a low-luminance part and hence affects a photographed image. Such a phenomenon is generally called "flare".

SUMMARY OF THE INVENTION

The present invention has been made in view of the above-mentioned problem. Therefore, it is an object of the present invention to provide an imaging apparatus capable of reducing only an influence of flare without influencing contrast, etc. of an entire image, by preliminarily measuring degrees of influences of the flare according to zooming positions, and changing a gradation sequence characteristic based on changing amounts of the gradation sequence characteristic calculated on the basis of values of the influential degrees thereof.

To accomplish the above mentioned object, an imaging apparatus of the present invention comprises an optical lens unit of a photographic optical system; an imaging device for converting light received through the optical lens to electrical signals; a zooming device for changing a focal length of the photographic optical system; a zooming position detector for detecting a current zooming position; an A/D converter for converting analog image signals outputted from the imaging device to digital image signals; and a gradation sequence converter which converts a gradation sequence characteristic of the digital image signals by referring to a gradation sequence conversion table for converting the gradation sequence characteristic, wherein converting amounts of the gradation sequence conversion table are changed based on a current zooming position detected by the zooming position detector.

The present invention reduces influence of the light other than light from a subject by the zooming position of a zoom lens. Particularly in a wide-angle zoom lens in which the focal length is short, there is a case where it is influenced by the light other than the subject and thus entire picture becomes light. This influence of the light other than the light from the subject is a flare characteristic which a lens intrinsically has and decides whether the influence is more likely to be produced at a "wide-range" side or at a "telescopic-range" side. By preliminarily measuring values of such a flare characteristic and changing a gamma table as the gradation sequence conversion table so as to remove the influence depending upon the zooming position, it is possible to remove the influence of the flare and thereby to take photographs of good pictures.

According to the present invention, because the converting amounts of the gradation sequence conversion table are changed on the basis of the current zooming position detected by the zooming position detector, it is possible to remove the influence of the flare and to photograph the good pictures.

Following are preferred embodiments 1 to 9 of the imaging apparatus according to the present invention, any combinations thereof are considered to be preferred ones of the present invention unless any contradictions occur.

(1) The converting amounts of the gradation sequence conversion table are changed by shifting a characteristic curve of the gradation sequence conversion table in parallel in a case of changing the converting amounts of the gradation sequence conversion table on the basis of the current zooming position detected by the zooming position detector.

The influence of the flare is removed by shifting the gamma table in parallel in this embodiment. If a shape of the gamma table is changed, contrast in entire picture changes, and thus the gradation sequence characteristic may become different from the aimed one. Accordingly, by using the gamma table while shifting it, it is possible to remove only the influence of the flare, without changing the gradation sequence characteristic as a whole.

According to this embodiment, because the converting amounts of the gradation sequence conversion table are changed by shifting the characteristic curve of the gradation sequence conversion table in parallel in case of changing the converting amounts of the gradation sequence conversion table, it is possible to remove only the influence of the flare without changing the gradation sequence characteristic as a whole.

(2) The converting amounts of the gradation sequence conversion table are stored in a rewritable nonvolatile memory.

This embodiment stores the changing amounts of the gradation sequence conversion table into a rewritable nonvolatile memory. Although influence of a general flare characteristic can be roughly known from a design of the lens, there is a case that the characteristic differs in some degree depending upon variations in manufacturing. Therefore, by measuring the inherent characteristic value of each lens unit and storing it in the rewritable nonvolatile memory, it is possible to eliminate an influence of differences in characteristics in the lenses caused by the variations in the manufacturing, and at the same time, to cope with exchanging of the lenses even in a case of replacement or repair of the lens unit.

According to this embodiment, because the inherent characteristic value of each lens unit is measured and is stored in the rewritable nonvolatile memory, it is possible to eliminate the influence due to the differences in characteristics in the lenses caused by the variations in the manufacturing, and at the same time, to cope with exchanging of the lenses even in the case of replacement or repair of the lens unit.

(3) The imaging apparatus further comprises a signal amplifier for amplifying the analog image signals, wherein the converting amounts of the gradation sequence conversion table are compensated based on a degree of amplification of the signals by the signal amplifier.

This embodiment compensates the changing amounts of the gradation sequence conversion table based on a degree of amplification of AGC as a signal amplifier. There is a fear that the influence on the image signals caused by the flare is amplified by the AGC. Therefore, it is possible to calculate the changing amounts of the gradation sequence conversion table more accurately, by carrying out compensation of the changing amounts by the degree of amplification of the AGC.

According to this embodiment, because the compensation of the changing amounts of the gradation sequence conversion table is carried out from the degree of amplification of the AGC, it is possible to calculate the changing amounts thereof more accurately.

(4) The converting amounts of the gradation sequence conversion table based on the degree of amplification of the signals of the signal amplifier are stored in a rewritable nonvolatile memory.

This embodiment stores the changing amounts of the gradation sequence conversion table based on the degree of amplification of the signal amplifier into the rewritable nonvolatile memory. Thus, it is possible to easily cope with even a case where there are variations in characteristics of the AGC, for example.

(5) The imaging apparatus further comprises a photometric instrument for measuring luminance of a subject; and an exposure controller for controlling an amount of exposure in accordance with a result of photometry measured by the photometric instrument, wherein the converting amounts of the gradation sequence conversion table are compensated based on the result of photometry by the photometric instrument and a result of the control of the amount of exposure by the exposure controller.

This embodiment carries out compensation of the changing amounts of the gradation sequence conversion table based on a photometry value and a result of control of an amount of exposure. For example, in a case where it is obvious that the amount of exposure lacks due to a limitation imposed on exposure time or the like as compared with a condition of exposure for allowing the amount of exposure to be as an appropriate amount of exposure which is calculated from the photometry value, the entire picture becomes darker. In such a case, there is a possibility that the picture becomes even darker if black floated with the flare is removed by shifting the characteristic conversion table, and consequently the picture becomes extremely dark one. Accordingly, the changing amounts of the gradation sequence conversion table are compensated by the photometry value and the result of the control of the exposure, hence it is possible to carry out photographing of pictures with less feeling of discomfort.

According to this embodiment, because the converting amounts of the gradation sequence conversion table are compensated based on the result of photometry by the photometric instrument and the result of the control on the amount of exposure by the exposure controller, it is possible to compensate the changing amounts of the gradation sequence conversion table based on the photometry value and the result of the control of the exposure, thereby to perform photographing with less feeling of discomfort.

(6) The converting amounts of the gradation sequence conversion table which are created based on the result of photometry and the result of the control of the amount of exposure are stored in a rewritable nonvolatile memory.

This embodiment stores the converting amounts of the gradation sequence conversion table created based on the result of photometry and the result of the control on the amount of exposure into the rewritable nonvolatile memory. According to this embodiment, by preliminarily storing the converting amounts of the gradation sequence conversion table which are created on the basis of the result of photometry and the result of the control on the amount of exposure in the rewritable nonvolatile memory, it is possible to change the compensating amounts easily even if a control method of the auto exposure control (AE) is altered.

(7) The imaging apparatus further comprises a strobe light emitter; and a strobe mode selector for selecting one strobe mode from a plurality of strobe modes, wherein the converting amounts of the gradation sequence conversion table are changed in accordance with a strobe mode which is selected by the strobe mode selector.

This embodiment compensates the changing amounts of the gradation sequence conversion table according to the strobe light emission mode. There is a case that the exposure time at the time of strobe emission is subjected to a limitation by the strobe mode. For example, in a strobe mode which is often called a night-scene mode or a slow-synchronization mode or the like, the strobe emission is carried out for a long exposure time, whereas in a normal strobe mode, a limitation is imposed on the exposure time to such an extent that blurring does not occur. The influence of the flare becomes larger as the exposure time becomes larger. Accordingly, it is necessary to change the compensation of the changing amounts of the gradation sequence conversion table according to a difference in the strobe mode.

According to this embodiment, because the converting amounts of the gradation sequence conversion table are changed according to the selected strobe mode, it is possible to carry out the photographing with less blurring by hand and flare.

(8) The converting amounts of the gradation sequence conversion table which are changed in accordance with the strobe mode selected by the strobe mode selector are stored in a rewritable nonvolatile memory.

This embodiment stores the converting amounts of the gradation sequence conversion table which are changed in accordance with the strobe mode selected by a strobe mode selector into the rewritable nonvolatile memory. According to this embodiment, by storing the converting amounts of the gradation sequence conversion table changed by the selected strobe mode in the rewritable nonvolatile memory, it is possible to change the compensating amounts easily even if the control method of the auto exposure control (AE) is altered.

(9) The imaging apparatus according to any one of (2), (4), (6) and (8) further comprises a communication device for carrying out communication with an external device, wherein at least one of the converting amounts of the gradation sequence conversion table and compensating amounts thereof is rewritten by the communication device.

This embodiment further comprises a communication device for carrying out communication with an external device, and at least one of the converting amounts of the gradation sequence conversion table and the compensating amounts thereof is rewritten through the communication device. According to this embodiment, by providing the changing amounts of the gradation sequence conversion table and the compensating amounts thereof to be rewritten through the communication device, it is possible to change the gradation sequence conversion table without carrying out disassembling or the like of the imaging apparatus.

DESCRIPTION OF THE PREFERRED EMBODIMENTS

Figure 1:
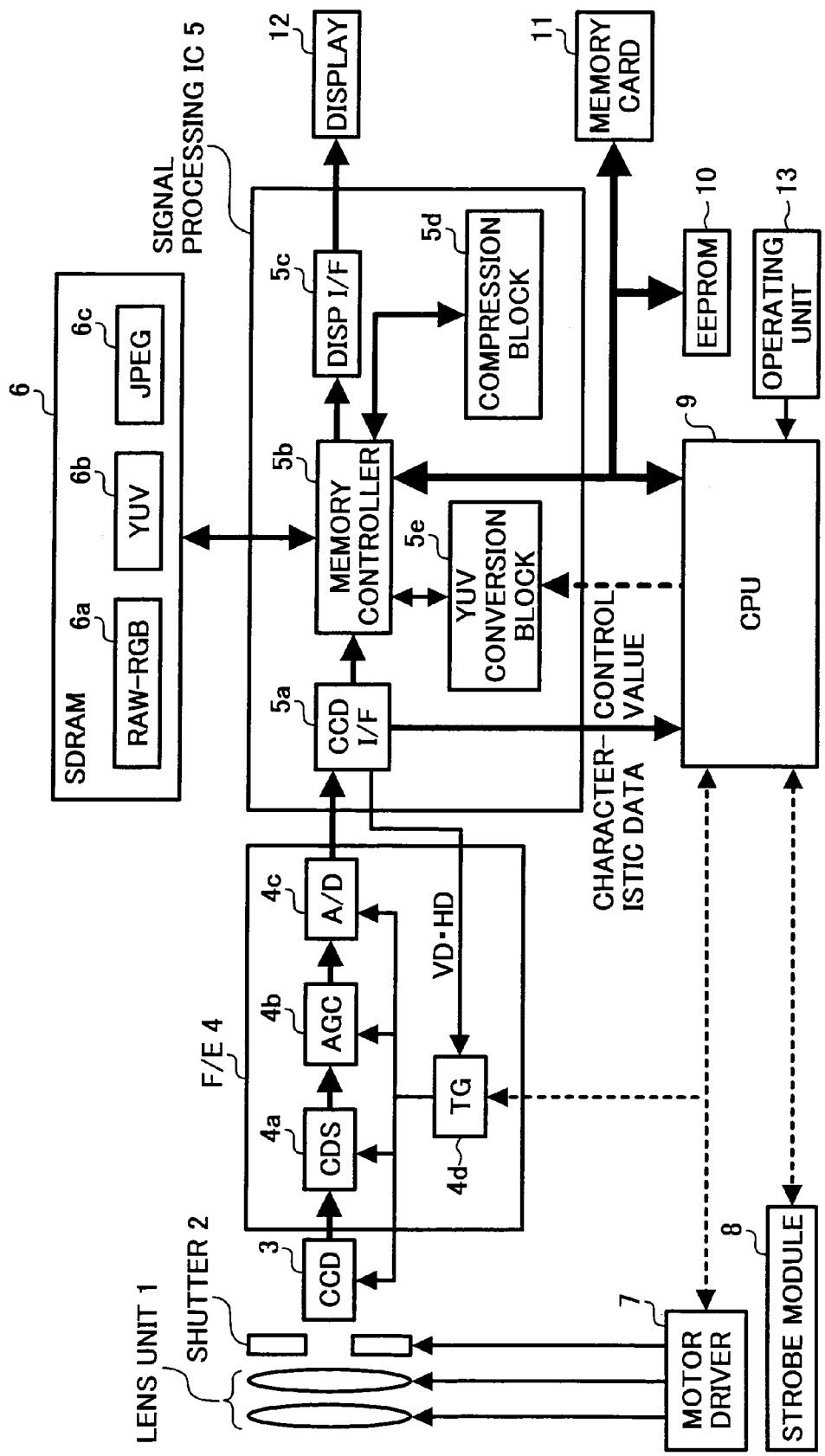
FIG. 1 is a block diagram showing a system of a digital camera according to the present invention.

Hereinafter, the present invention will be described in detail in accordance with embodiments shown in the drawings. However, it should be noted that structural elements, kinds, combinations, configurations or their relative arrangements described in the embodiments are merely illustrative by way of example, thus it is not intended to limit the scope of the present invention by them unless otherwise specifically stated.

FIG. 1 is a block diagram showing a system of a digital camera according to the present invention. The digital camera comprises a lens unit 1, a mechanical mechanism 2 having a shutter, aperture stop/filter portions and so on, a CCD (Charge Coupled Device) 3 as an imaging device, a front end IC (F/E) 4, a signal processing IC 5, a SDRAM 6, a motor driver 7, a strobe module 8, a CPU 9, an EPROM 10, a memory card 11, a Display 12, and an operating unit 13. The front end IC (F/E) 4 comprises a CDS (Correlated Double Sampling) circuit 4a for carrying out sampling of electrical signals outputted from the CCD 3, a variable gain amplifier (AGC amplifier: VG (Variable Gain) amplifier) 4b for amplifying electrical signals which the CDS (Correlated Double Sampling) circuit 4a outputs, an A/D converter 4c which carries out A/D (Analog/Digital) conversion of electrical signals outputted from the amplifier 4b and outputs digital image data, and a TG (control signal generation) portion 4d for generating control signals for operation. The signal processing IC 5 comprises a CCD-I/F 5a of the signal processing IC, a memory controller 5b for reading out written RAW-RGB signals, a Disp I/F 5c for reading out YUV data and carrying out displaying of the data onto TV or a liquid crystal monitor or the like, a compression block 5d for carrying out JPEG compression, and a YUV conversion block 5e in which the RAW-RGB signals are converted into YUV data. The SDRAM 6 comprises a RAW-RGB 6a for storing image signals converted into digital data, a YUV converting portion 6b for converting RGB data into YUV data, and a JPEG compressing portion 6c in which the YUV data are read out again and the JPEG compression is carried out in a compression block. The motor driver 7 drives a pulse motor for adjustment of the aperture stop which constitutes the mechanical mechanism 2. The CPU 9 is configured for controlling the digital camera as a whole. The EPROM 10 stores various data for controlling or the like. The memory card 11 for storing the JPEG-compressed data, as JPEG image data to which header data or the like are added. The Display 12 displays the data onto the TV or the liquid crystal monitor or the like. The operating unit 13 comprises various operators including a mode-switching switch.

Next, operation of the digital camera will be described. Light which is received on a light-receiving surface of the CCD 3 through the lens unit 1 shown in FIG. 1 is converted into electrical signals. The analog image signals are outputted by the CCD 3. The outputted analog image signals are converted into digital signals by the F/E (CDS 4a, AGC 4b, A/D 4c) 4. In the CDS 4a, only the valid analog image signals are retrieved from the output from the CCD 3. The amplification of the analog image signals is carried out in the AGC 4b. Then, the A/D 4c converts the analog image signals into digital signals. Timing for those is synchronized by a timing signal of the TG as a timing signal generator.

The image signals (RAW-RGB) 6a which are converted into digital signals are loaded into the SDRAM through the CD-I/F 5a of the signal processing IC 5. Here, in the CCD-I/F 5a, integral values for respective R, G, B are calculated in relation to 256 areas in which a picture is divided into 16 sections horizontally and vertically, respectively. The CPU 9 reads out these calculated integral values, and carries out arithmetic operation of AE (Auto Exposure) and AWB (Auto White Balance). The written RAW-RGB signals are read out by the memory controller 5b, converted into the YUV data by the YUV conversion block 5e, and written back into the SDRAM. At this time, an AWB gain for adjusting a white balance is calculated from a result of the arithmetic operation mentioned above. After having applied a calculated gain to the RAW-RGB signals, the applied RAW-RGB signals are converted into the YUV data. In addition, a gradation sequence conversion is carried out based on a gradation sequence conversion table (gamma table). The Disp I/F 5c reads out the YUV data, and the data are displayed onto the TV or the liquid crystal monitor. In a live-view mode in which a through-picture is displayed prior to performing of still image photographing, the above-mentioned operation is carried out repeatedly in accordance with a reading-out cycle of the CCD such as 1/30 second.

For the AE, luminance of the picture is detected from the read-out integral values of the RGB, exposure amount-controlling data for exposure of an upcoming live-view picture or a still image is calculated, and an amount of electronic shutter inputted into the CCD 3 by the TG 4d is controlled on the basis of the calculated controlling data.

In a zoom lens, its focal length is changed when the CPU 9 controls a mode drive for the motor driver 7. When a command for changing magnification of zooming is inputted from the operating unit 13 by a user, the CPU 9 drives the motor in accordance with the command. Meanwhile, in a case where zoom driving is carried out by a pulse motor, a zooming position can be detected on the basis of the number of driving pulses and hence it is possible to detect the position without adding a special position-detecting circuit. Although not shown in the drawings, however, a zooming position-detecting circuit may be separately provided, to detect the zooming position.

At the time of photographing the still picture, the RGB data of the SDRAM are converted into the YUV data by the YUV converting portion 6b, which are written back into the SDRAM. The YUV data are read out again, JPEG-compressioned in the compression block, and written back into the SDRAM. In the SDRAM, the JPEG-compressioned data are converted to the JPEG image data by adding the header data or the like thereto, and the converted JPEG image data are stored in the memory card 11 by the CPU 9.

A program for controlling the CPU 9, the gradation sequence characteristic table, changing amounts for changing the zooming positions, and compensation data for compensating these changing amounts are stored in the EPROM 10, which the CPU 9 carries out the control of the photographing based on the program and the data stored in the EPROM 10.

Figure 2:
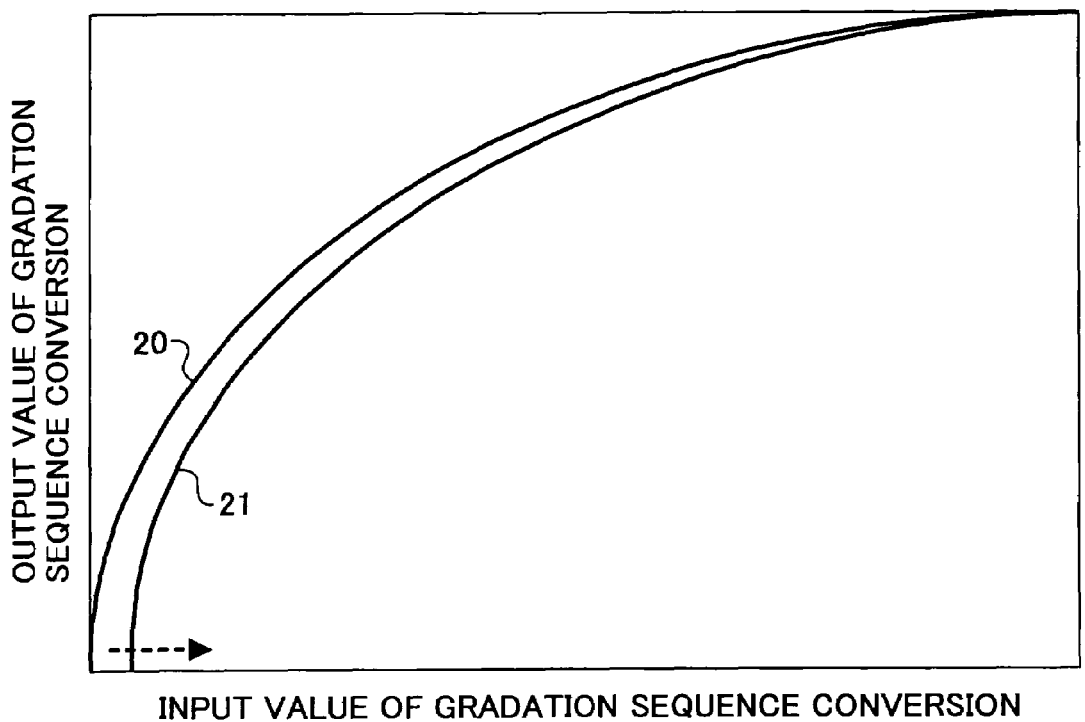
FIG. 2 is a graph to explain shifting of a gamma table according to the present invention.

FIG. 2 is a graph to explain shifting of the gamma table according to the present invention. A vertical axis represents the output value of the gradation sequence conversion, while a horizontal axis represents the input value of the gradation sequence conversion. It is assumed here that as the lens unit moves toward a longer side of the focal length, an influence of flare in the lens unit by light from outside of a photographing field (a range actually photographed) becomes more conspicuous. In a case where the flare has equally influenced the picture, the entire picture shifts to be lighter as if an offset is added to original light of the subject. In order to remove such influence, as shown in FIG. 2, a gamma table 20 is shifted to a gamma table 21 as shown by an arrow. Since the influence of the flare varies depending on the zooming position, shifting amounts are changed according to the number of pulses based on which the CPU 9 has driven the zoom. The shifted gamma table 21 is set in the YUV converting portion 6b and is used for the gradation sequence conversion at the time of YUV conversion, thereby an influence of floating-black in the picture with the flare is removed.

The shifting amounts are subject to compensation according to exposure time at the exposure, a degree of amplification of the AGC, and a strobe mode. The shifting of the gamma table is compensated based on the zooming position, by the degree of amplification of the AGC (gain). Data in which exposure of unnecessary light is added by the flare are outputted from the CCD 3 together with data on exposure by the light from the subject. There is a fear that an offset component with the flare is also amplified in the AGC 4b. Accordingly, even with the same zooming position, the influence of the flare with respect to the image may be changed depending upon the degree of amplification of the AGC. Therefore, when the AGC gain is larger than 1, compensation is carried out in which the shifting amounts of the gamma table in FIG. 2 are set to be larger than the changing amounts calculated from the zooming position. Also, when the AGC gain is smaller than 1, compensation is carried out in which the changing amounts are adapted to be small.

Next, explanation will be made below on compensation of the shifting amounts based on a result of photometry and the control amount of exposure.

It is assumed here that 3 seconds of exposure is calculated to be necessary to obtain the appropriate amount of exposure from the result of the photometry. The amount of exposure is insufficient if a limitation imposed on the exposure time of the digital camera in this case has been set to be 1 second. Photographing in this case turns out that the entire picture is darker. When the amount of exposure lacks largely and hence the picture becomes dark as stated above, a case may occur that there is no feeling of discomfort to see such picture even if the shifting has not been carried out, since the picture becomes extremely dark if the gamma table is shifted more in the situation when the amount of exposure lacks largely. Accordingly, when the exposure time lacks 2 seconds, the compensation is carried out in which the shifting calculated from the zooming position is not carried out at all. When the exposure time lacks 1 second, compensation is carried out in which only a half of the shifting as having been calculated from the zooming position is performed.

Subsequently, explanation is given below on compensation of the shifting amounts depending on different strobe modes.

The strobe mode is set by the operating unit 13. There are two modes as the strobe mode: a mode that carries out a strobe-light emission for a long exposure time, as often called a night-scene mode, or a slow-synchronization mode or the like; and a normal strobe mode in which a limitation is imposed on the exposure time to such an extent that blurring by hand does not occur.

As the exposure time becomes larger, the influence of the flare becomes larger. Accordingly, when the user selects the slow-synchronization mode, the compensation is carried out so as to increase the shifting amounts of the gamma table shown in FIG. 2, in light of the fact that the exposure time becomes longer in that mode.

On the other hand, when the normal strobe mode has been selected, the exposure time is set so short that the blurring is difficult to occur. The exposure time is also made short even in the case where it is determined dark from the photometry result, thereby rendering the influence of the flare smaller. Given this factor, the compensation is made to decrease the shifting amounts of the gamma table.

Figure 3:
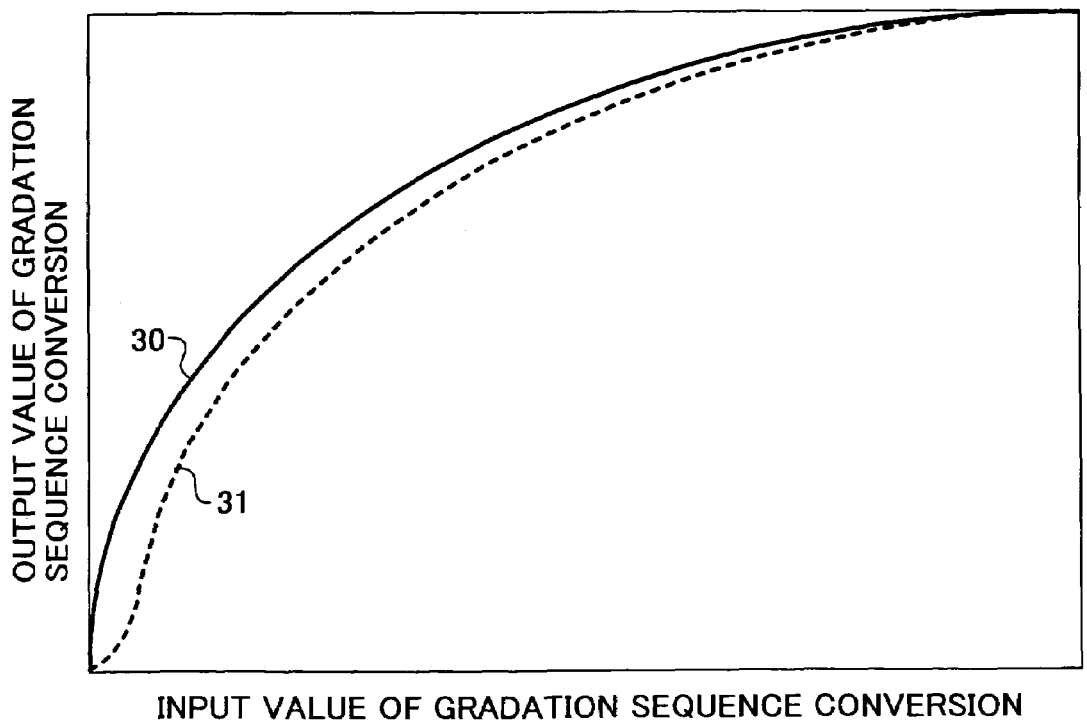
FIG. 3 is a graph to explain changing of the shape of the gamma table according to the present invention.

In the present embodiment, the gamma table is shifted to solve the problem that the offset component caused by the flare exists on the picture, without changing the gradation sequence characteristic of the photographed image, through giving no change in the gradation sequence characteristic (shape of curve) itself. However, as far as this aim can be roughly accomplished, the shape of the curve of the gamma table 30 may be changed as shown by a reference numeral 31 in FIG. 3, in place of shifting the gamma table.

According to the present invention, because the converting amounts of the gradation sequence conversion table are changed on the basis of the current zooming position detected by zooming position detecting means, it is possible to remove the influence of the flare and to photograph good pictures.

According to the first embodiment, because the converting amounts of the gradation sequence conversion table are changed by shifting the characteristic curve of the gradation sequence conversion table in parallel in case of changing the converting amounts of the gradation sequence conversion table, it is possible to remove only the influence of the flare without changing the gradation sequence characteristic as a whole.

According to the second embodiment, because the inherent characteristic value of each lens unit is measured and is stored in the rewritable nonvolatile memory, it is possible to eliminate the influence due to the differences in characteristics in the lenses caused by the variations in the manufacturing, and at the same time, to cope with exchanging of the lenses even in the case of replacement or repair of the lens unit.

According to the third embodiment, because the compensation of the changing amounts of the gradation sequence conversion table is carried out from the degree of amplification of the AGC, it is possible to calculate the changing amounts thereof more accurately.

According to the fourth embodiment, because the compensating amounts in accordance with the degree of amplification of the AGC are stored in the rewritable nonvolatile memory, it is possible easily cope with even a case where there are variations in characteristics of the AGC, for example.

According to fifth embodiment, because the converting amounts of the gradation sequence conversion table are compensated based on the result of photometry by the photometric instrument and the result of the control on the amount of exposure by the exposure controller, it is possible to compensate the changing amounts of the gradation sequence conversion table based on the photometry value and the result of the control of the exposure, thereby to perform photographing with less feeling of discomfort.

According to the sixth embodiment, by preliminarily storing the converting amounts of the gradation sequence conversion table which are created on the basis of the result of photometry and the result of the control on the amount of exposure in the rewritable nonvolatile memory, it is possible to change the compensating amounts easily even if a control method of the auto exposure control (AE) is altered.

According to the seventh embodiment, because the converting amounts of the gradation sequence conversion table are changed according to the selected strobe mode, it is possible to carry out the photographing with less blurring by hand and flare.

According to the eighth embodiment, by storing the converting amounts of the gradation sequence conversion table changed by the selected strobe mode in the rewritable nonvolatile memory, it is possible to change the compensating amounts easily even if the control method of the auto exposure control (AE) is altered.

According to the ninth embodiment, by providing the changing amounts of the gradation sequence conversion table and the compensating amounts thereof to be rewritten through the communication device, it is possible to change the gradation sequence conversion table without carrying out disassembling or the like of the imaging apparatus.

What is claimed is:

1. An imaging apparatus, comprising:
    an optical lens unit of a photographic optical system;
    an imaging device which converts light received through the optical lens unit to electrical signals to output analog image signals;
    a zooming device which changes a focal length of said photographic optical system;
    a zooming position detector which detects a current zooming position of the optical lens unit;
    an A/D converter which converts the analog image signals outputted from said imaging device to digital image signals;
    a gradation sequence converter which converts a gradation sequence characteristic of said digital image signals by referring to a gradation sequence conversion table for converting the gradation sequence characteristic;
    a storage device which stores values of a flare characteristic of the optical lens unit, which are preliminarily measured in correspondence with zooming positions of the optical lens unit; and
    a control device which changes converting amounts of said gradation sequence conversion table based on the current zooming position detected by said zooming position detector and the stored values of the flare characteristic of the optical lens unit so as to remove the influence of the flare, the flare being caused by light other than light from a subject being imaged.

2. The imaging apparatus according to claim 1, wherein the converting amounts of said gradation sequence conversion table are changed by shifting a characteristic curve of said gradation sequence conversion table in parallel in a case of changing the converting amounts of said gradation sequence conversion table on the basis of the current zooming position detected by said zooming position detector.

3. The imaging apparatus according to claim 1, wherein the values of the flare characteristic of the optical lens unit are stored in a rewritable nonvolatile memory.

4. The imaging apparatus according to claim 1, further comprising a signal amplifier configured to amplify said analog image signals, wherein
    the converting amounts of said gradation sequence conversion table are compensated based on a degree of amplification of the signals by the signal amplifier.

5. The imaging apparatus according to claim 4, wherein the converting amounts of the gradation sequence conversion table based on the degree of amplification of the signals of said signal amplifier are stored in a rewritable nonvolatile memory.

6. The imaging apparatus according to claim 1, further comprising a photometric instrument configured to measure luminance of a subject; and an exposure controller configured to control an amount of exposure in accordance with a result of photometry measured by the photometric instrument, wherein
    the converting amounts of said gradation sequence conversion table are compensated based on the result of photometry by said photometric instrument and a result of the control of the amount of exposure by the exposure controller.

7. The imaging apparatus according to claim 6, wherein the converting amounts of the gradation sequence conversion table which are created based on said result of photometry and the result of the control of the amount of exposure are stored in a rewritable nonvolatile memory.

8. The imaging apparatus according to claim 1, further comprising a strobe light emitter; and a strobe mode selector configured to select one strobe mode from a plurality of strobe modes, wherein
    the converting amounts of said gradation sequence conversion table are changed in accordance with a strobe mode which is selected by the strobe mode selector.

9. The imaging apparatus according to claim 8, wherein the converting amounts of the gradation sequence conversion table which are changed in accordance with the strobe mode selected by said strobe mode selector are stored in a rewritable nonvolatile memory.

10. The imaging apparatus according to claim 3, further comprising a communication device configured to carry out communication with an external device, wherein
    at least one of the values of the flare characteristic of the optical lens unit and a compensating amounts thereof is rewritten by said communication device.

11. The imaging apparatus according to claim 5, further comprising a communication device configured to carry out communication with an external device, wherein
    at least one of the converting amounts of said gradation sequence conversion table and a compensating amounts thereof is rewritten by said communication device.

12. The imaging apparatus according to claim 7, further comprising a communication device configured to carry out communication with an external device, wherein
    at least one of the converting amounts of said gradation sequence conversion table and a compensating amounts thereof is rewritten by said communication device.

13. The imaging apparatus according to claim 9, further comprising a communication device configured to carry out communication with an external device, wherein
    at least one of the converting amounts of said gradation sequence conversion table and a compensating amounts thereof is rewritten by said communication device.

* * * * *